US007039051B2

(12) United States Patent
Ohashi et al.

(10) Patent No.: US 7,039,051 B2
(45) Date of Patent: May 2, 2006

(54) DATA SENDING SYSTEM

(75) Inventors: Takato Ohashi, Fukuoka (JP); Kouichi Tsuzaki, Fukuoka (JP); Makoto Kawatoko, Fukuoka (JP); Kiyohide Yamashita, Fukuoka (JP); Youichi Ashida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 962 days.

(21) Appl. No.: 10/075,756

(22) Filed: Feb. 13, 2002

(65) Prior Publication Data

US 2002/0077788 A1 Jun. 20, 2002

Related U.S. Application Data

(63) Continuation of application No. PCT/JP99/04436, filed on Aug. 18, 1999.

(51) Int. Cl.
*H04L 12/56* (2006.01)

(52) U.S. Cl. ....................................... 370/389; 709/208

(58) Field of Classification Search ................ 370/400, 370/258, 248, 389, 377, 384, 222; 709/102, 709/200, 208, 203, 209

See application file for complete search history.

(56) References Cited

U.S. PATENT DOCUMENTS

| | | | | |
|---|---|---|---|---|
| 4,970,720 | A * | 11/1990 | Esaki | 370/416 |
| 6,070,075 | A * | 5/2000 | Kim | 455/437 |
| 6,259,704 | B1 | 7/2001 | Asahina et al. | |

FOREIGN PATENT DOCUMENTS

| | | |
|---|---|---|
| JP | 57-106260 | 7/1982 |
| JP | 1-188137 | 7/1989 |
| JP | 3-71746 | 3/1991 |
| JP | 9-51573 | 2/1997 |
| JP | 10-51479 | 2/1998 |
| JP | 11-187074 | 7/1999 |

OTHER PUBLICATIONS

Japanese Office Action dated Mar. 25, 2005.

* cited by examiner

*Primary Examiner*—Brenda Pham
(74) *Attorney, Agent, or Firm*—Katten Muchin Rosenman LLP

(57) ABSTRACT

A data sending system which prevents a parity error occurrence in a data receiving unit is provided. The data sending system provided is related to data sending systems and, particularly, to a data sending system where plurality of data sending units share a path for data transmission. The data sending system provided comprises a network consisting of a data path and control path, a control unit for instructing data sending through said control path, one or plural data sending units for sending, according to an instruction from said control path, data to a specific one of plural logical paths of said data path, and a data receiving unit permanently connected to the one of plural logical paths of said data path. Said control unit has a determining section which determines a time span, during which no sending data exists in a logical path connected to said data receiving unit, and also instructs a specific unit of said data sending units to send dummy data during the time span. Said data sending unit has a dummy data sending unit which sends the dummy data, to which an appropriate parity information is added, according to said instruction.

8 Claims, 14 Drawing Sheets

NETWORK CONTROL UNIT
1
2
CONTROL UNIT
3
DATA RECEIVING UNIT
4-1
DATA SENDING UNIT
4-2
DATA SENDING UNIT
4-3
DATA SENDING UNIT
5-1
5-2
5-3
6
7
8

90 bytes
3 bytes
1 2 3 4 90
A1 A2 C1
B1 E1 F1
D1 D2 D3
H1 H2 H3
B2 K1 K2
D4 D5 D6
D7 D8 D9
D10 D1 D1
Z1 Z2 E2
SOH
AU POINTERS
SOH
SOH
PAYLOAD
9 LINES
VIDEO DATA 1.536 Mbps
OCCUPIED TS NUMBER 25 TS (1600 Kbps)
1536kbps(24TS)
ADDITION
64K×24
64k
FAIS XST XRR XS XAV F BAIS P
VIDEO DATA 4.608 Mbps
OCCUPIED TS NUMBER 73 TS (4672 Kbps)
4608kbps(72TS)
ADDITION
64K×72
64k
FAIS XST XRR XS XAV F BAIS P MPEG-TS
$t_1$
MPEG-TS
$t_2$
(*)
$t_3$
MPEG-TS
(*) : CONVENTIONAL: UNSPECIFIED DATA
: PRESENT INVENTION: DUMMY DATA CONTROL PATH
CONTROL UNIT
2
8-1
8-2
t1
t2
t3
4-1
4-2
4-3
4-4
4-n
DATA SENDING UNIT
DATA 1
DATA 2
DATA 3
DATA 4
DATA n
DATA PATH
3
DATA RECEIVING UNIT
STOP DATA SENDING
DATA SENDING START INSTRUCTION
DUMMY DATA SENDING INSTRUCTION 4-n
41
STATUS REPORT SECTION
42
SENDING/RECEIVING SECTION
DATA SENDING SECTION
43
DUMMY SENDING SECTION
44
8-1
8-2
2
21
IDENTIFICATION REQUEST SECTION
22
DETERMINING SECTION
23
SCHEDULING SECTION NORMAL PROCESS
S111
CONTROL UNIT
STATUS IDENTIFICATION
ISSUE OF COMMAND
S112
DATA SENDING UNIT
STATUS REPORT
S113
CONTROL UNIT
DUMMY SENDING NEEDED
OR ABNORMALITY?
NO
YES
S114
CONTROL UNIT
DUMMY SENDING
ISSUE OF COMMAND
S115
DATA SENDING UNIT
DUMMY SENDING
PROCESS BY
CONTROL UNIT
PROCESS BY DATA
SENDING UNIT CONTROL PATH
DATA PATH
4-1
DATA SENDING UNIT
DATA 1
4-2
DATA SENDING UNIT
DATA 2
4-3
DATA SENDING UNIT
DATA 3
4-4
DATA SENDING UNIT
DATA 4
4-n
DATA SENDING UNIT
DATA n
3
DATA RECEIVING UNIT
8-1
8-2

4-1
DATA SENDING UNIT
DATA 1
4-2
DATA SENDING UNIT
DATA 2
4-3
DATA SENDING UNIT
DATA 3
4-4
DATA SENDING UNIT
DATA 4
4-n
DATA SENDING UNIT
DATA n
DATA PATH
3
DATA RECEIVING UNIT
DATA
8-2

DUMMY SENDING CONTROL
S301
DATA SENDING UNIT SCHEDULING OF DUMMY DATA SENDING
S302
DATA SENDING UNIT DUMMY SENDING

DATA SENDING SYSTEM

CROSS-REFERENCE TO RELATED APPLICATIONS

This application is a continuation of PCT/JP99/04436 filed on Aug. 18, 1999.

TECHNICAL FIELD

This invention relates to data sending systems, particularly to a system in which plural data sending units share paths for data transmission, wherein an occurrence of parity error can be avoided at a data receiving unit connected to said data transmission paths when any data sending unit does not perform data sending.

BACKGROUND OF THE INVENTION

With the types of data and methods of data sending having become diversified, recent years have seen a need for a particular data sending system, in which plurality of data sending units share paths for high-speed data transmission through which each unit transmit the data interactively, arise. To meet the need, paths for high-speed data transmission, such as bus-shaped or ring-shaped paths, wherein plural data sending units and the data receiving units receiving the sending data are connected to the path, are employed.

FIG. 1 shows an example of an image data sending system. As shown in FIG. 1, a network control unit 1 performs the control and management over the whole ring-shaped network (dual optical ring network). In this example, a control unit 2 controlling and managing the network, and a data receiving unit 3 receiving the image data which is transmitted through a ring-shaped network 8, are provided in the network control unit 1. The former control unit 2 performs the control and management over the whole network according to an instruction of operators given through a console unit 6, or a network control and management program stored in the control unit 2.

The latter data receiving unit 3 is permanently allocated to a predetermined logical path (channel), where it receives the data transmitted from one or a plurality of data sending units 4-1~4-3 and displays the received data on a monitor 7. Each data sending unit 4-1~4-3 is allocated a logical path, for communication, through which the data sending unit transmits data to said data receiving unit.

Said each data sending unit 4-1~4-3 shares a plurality of logical paths, to each of which each unit can send data in a free manner. The plural data sending units 4-1~4-3 send each image data, which is collected by each camera 5-1~5-3 provided to each unit 4-1~4-3, to the data receiving unit 3 by inserting the image data into the logical path of said data receiving unit 3 in a time sharing order.

FIG. 2(*a*) and FIG. 2(*b*) show an example of the image data which is transmitted in the ring-shaped network described in the FIG. 1.

FIG. 2(*a*) represents an example of a data sending format. Video signals from each camera 5-1~5-3 are converted into a variety of standardized video data signals (in this example, data signals with transmitting speed of 1,536 Mbps or 4,608 Mbps) and are stored sequentially in the payload section (payload) in a SDH signal flowing through the dual optical ring network 8. Each SDH signal mentioned above is to be received by the data receiving unit 3 as a predetermined logical path signal.

FIG. 2(*b*) shows an example of image data which is inserted alternately into the logical path of the data receiving unit 3. This example represents transport streams processed by MPEG 2 image system (MPEG 2-TS), wherein no data to be transmitted exists in a time slice between t2~t3 for data switching. Conventionally, unspecified data is transmitted when no data to be transmitted existed (all data sending units output whatever they recognize an input). When the data sending unit, to which the time slice is switched, has no data to send, a time span occurs at which no data is inserted into the time slice. Consequently, an unspecified data (NULL, as a kind of unspecified data) exists in the logical path during that time span. Thus, conventional system has a problem in such a case that a parity error occurs in the data receiving unit receiving sending data, which determines that there is a circuit abnormality in the path for high-speed data transmission.

DISCLOSURE OF THE INVENTION

The purpose of this invention is to provide, after considering a variety of problems mentioned above, a data system comprising: a network having one or plural sharable logical paths; a data receiving unit permanently connected to the predetermined logical path in said network; and one or plural data sending units sharing said predetermined logical path and being capable of sending data to said predetermined logical path; wherein no parity error occurs in the data receiving unit when no data to be transmitted exists in a data sending unit.

According to this invention, the data sending system to be provided comprises a network consisting of control paths and data paths, the control unit instructing data sending through said control paths, one or plural data sending units sending data to the one among the plural logical paths used as said data path according to an instruction from said control unit, and the data receiving unit permanently connected to the one among the plural logical paths used as said data path. Said control unit has a determining section for determining the time span during which no sending data exist in the logical path connected to said data receiving unit, and for instructing one of said data sending units to send dummy data. Said data sending unit has a dummy data sending section for sending dummy data, to which an appropriate parity information is added by said instruction.

According to this invention, also, the data sending system to be provided comprises the network consisting of control paths and data paths, plural data sending units each of which communicate through said control paths and send data to one of the plural logical paths used as a data path, and the data receiving unit permanently connected to one of the plural logical paths used as a data path. Said data sending units comprise the identification request/status report section for performing identification request and report of a data sending status between each data sending unit by the communication via said control paths, the determining section for determining the time span during which no sending data is existed in the logical paths connected to the data receiving unit by said identification request and report, a scheduling section for performing a scheduling process to send the dummy data during the time span, and the dummy data sending section for sending the dummy data to which the appropriate parity information is added according to said scheduling.

According to this invention, in addition, the data sending system to be provided comprises the network including data path, one or plural data sending units for sending the data to one of the plural logical paths used as said data path, and the data receiving unit permanently connected to one of the plural logical paths used as said data path. Said data sending unit comprises the scheduling section for performing the scheduling process of a predetermined time span during which no sending data exist in the logical paths connected to said receiving unit, and the dummy data sending section for sending the dummy data, to which the appropriate parity information added, during the time span.

In this invention, at least one of said data sending unit sends the dummy data, to which the appropriate parity information is added, to said data receiving unit. Thus, parity error occurrence in the data receiving unit is avoided.

DESCRIPTION OF THE PREFERRED EMBODIMENT

Figure 3A:
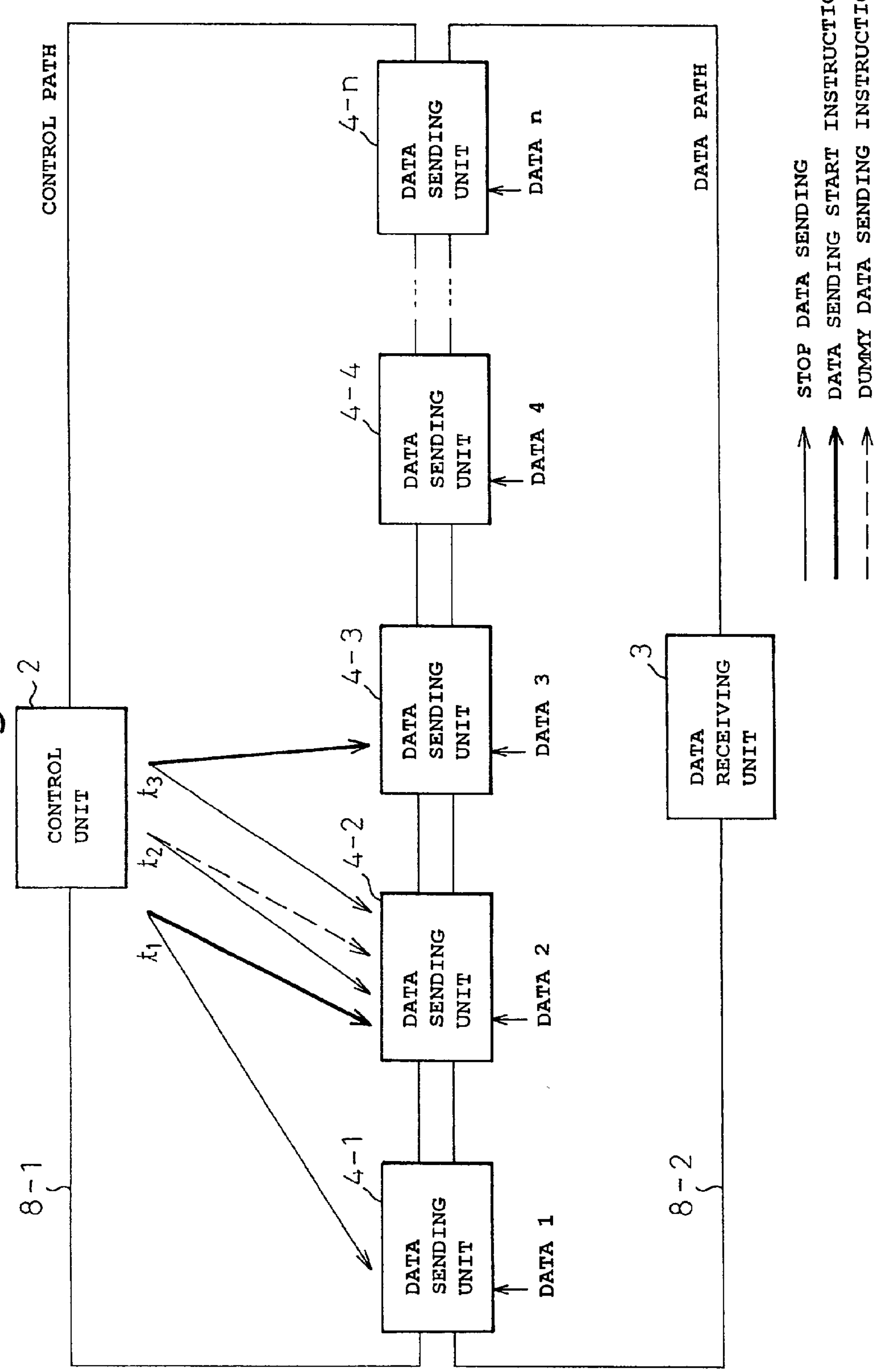
FIG. 3(*a*) and FIG. 3(*b*) are graphical representations of the first embodiment of this invention.
Figure 3B:
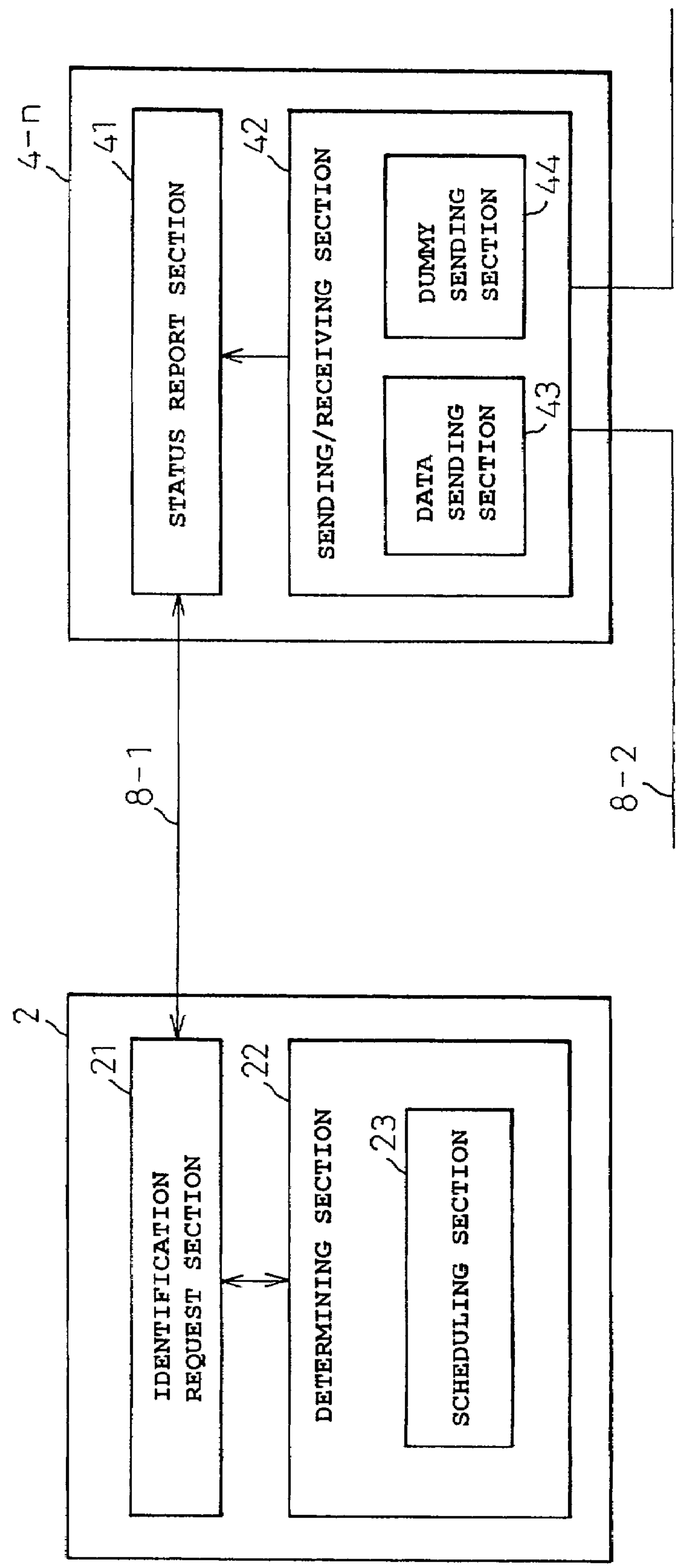
Figure 4A:
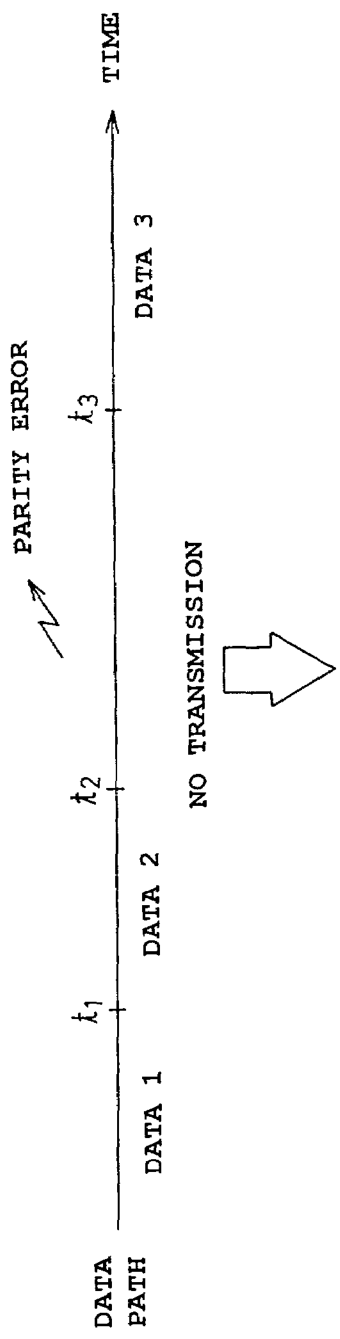
FIG. 4(*a*) and FIG. 4(*b*) are graphical representations showing one example of dummy data sending, which is introduced by this invention.
Figure 4B:
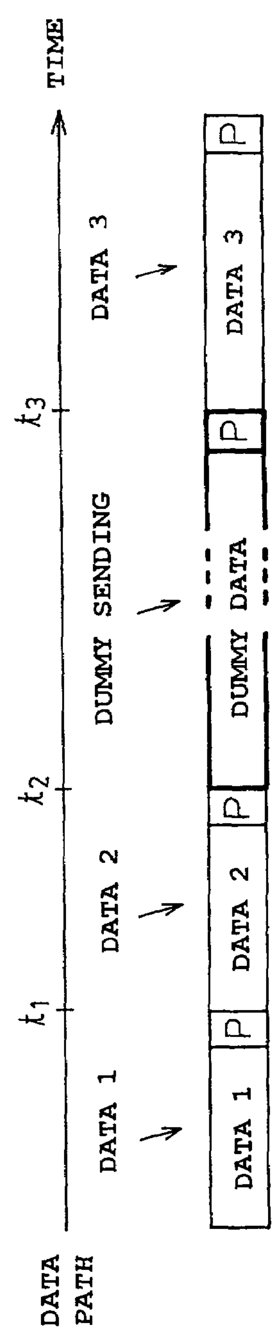

Both FIG. 3(*a*) and FIG. 3(*b*) show the first embodiment of this invention, and both FIG. 4(*a*) and FIG. 4(*b*) represent one example of the dummy data sending introduced by this invention.

Figure 1:
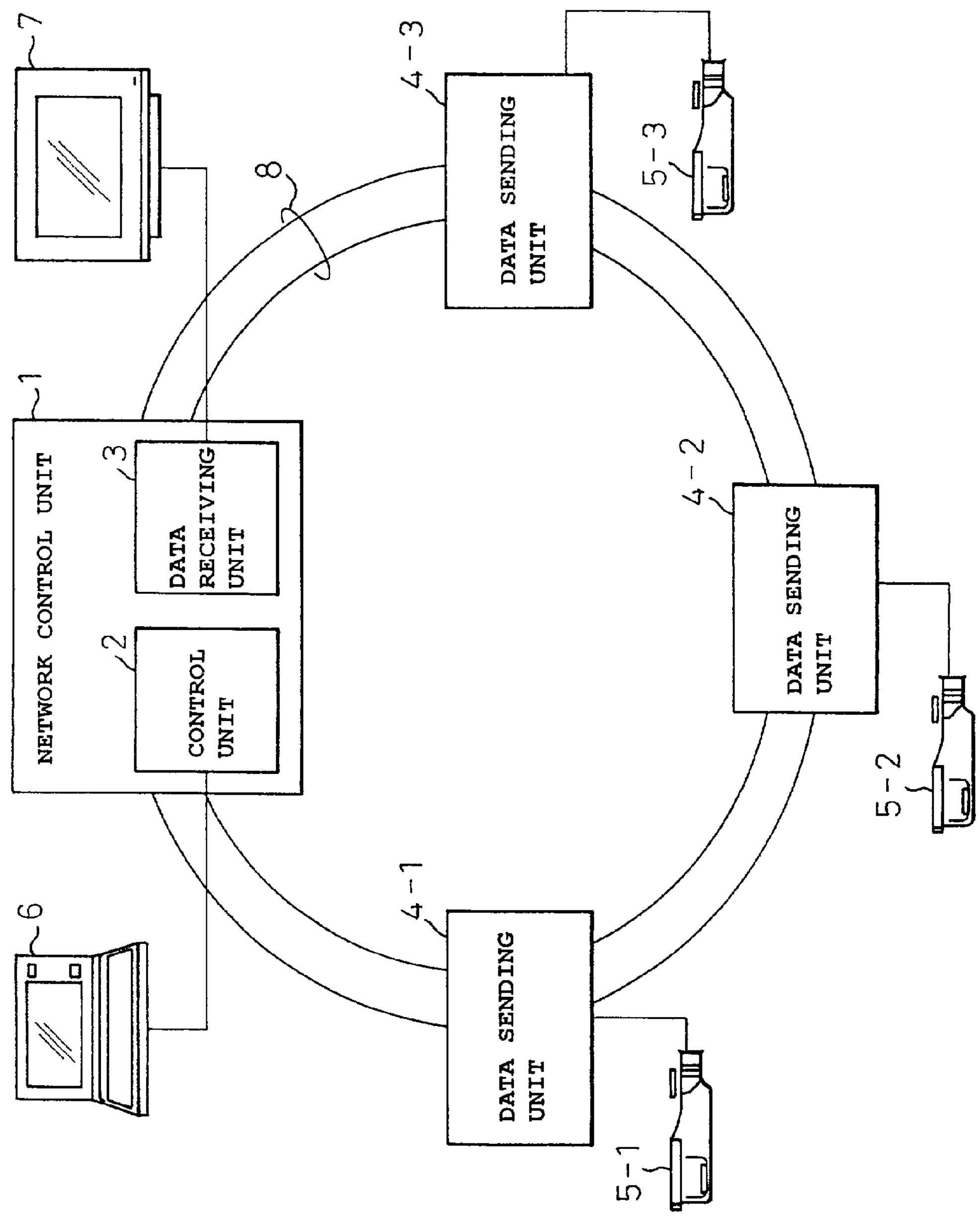
FIG. 1 is a graphical representation showing one example of the image data sending system.

In this example, the control unit 2 is the center for managing the dummy data sending control. Incidentally, a specific example of the system, in which the embodiment shown in FIG. 3(*a*) and FIG. 3(*b*) is applied, is the same conventional one as described in FIG. 1. Therefore, each reference numeral used in the ring-shaped paths 8 and the blocks 2~4, which described in FIG. 3(*a*) and FIG. 3(*b*), respectively, is the same one used in FIG. 1. The ring-shaped path 8-1 and 8-2 each represents the control path 8-1 and the data path 8-2, which is each logically allocated in the payload section in the SDH frame transmitted through the dual optical ring network.

In FIG. 3(*a*), the control unit 2 selects one or plural data sending units 4-1~4-n, which send data according to an instruction from the console 6 (see FIG. 1), and give a data sending instruction through the control path 8-1 to the selected data sending unit. The selected data sending unit 4-1~4-n send the data, consisting of the image shot with camera 5-1~5-3 (see FIG. 1), to a predetermined path on the data path 8-2 which is specified by the control unit 2. The image data is to be received and restored by the data receiving unit 3 permanently connected to the predetermined path.

When plurality of data sending units 4-1~4-n are specified, the image data from each data sending unit 4-1~4-n is inserted alternately into said data path in the time sharing order. When there is no image data to be sent, the dummy data sending control is performed to prevent parity error in the data receiving unit 3.

FIG. 3(*a*), FIG. 4(*a*), and FIG. 4(*b*) show one example of the dummy data sending control.

In this example, no data to be sent exist in the time slice between t2~t3, wherein the data sending unit 4-2 transmits a dummy data for the time slice. The FIG. 3(*a*) represents a following process: An instruction from the control unit 2 forces the data sending unit 4-1 to stop sending data at time t1 when the data sending unit 4-2 starts sending data, simultaneously. Then the data sending unit 4-2 stops sending said data at time t2 and starts sending data at the same time. Finally, the data sending unit 4-2 stops sending said dummy data at time t3 when the data sending unit 4-3 starts sending data, simultaneously.

Figure 2A:
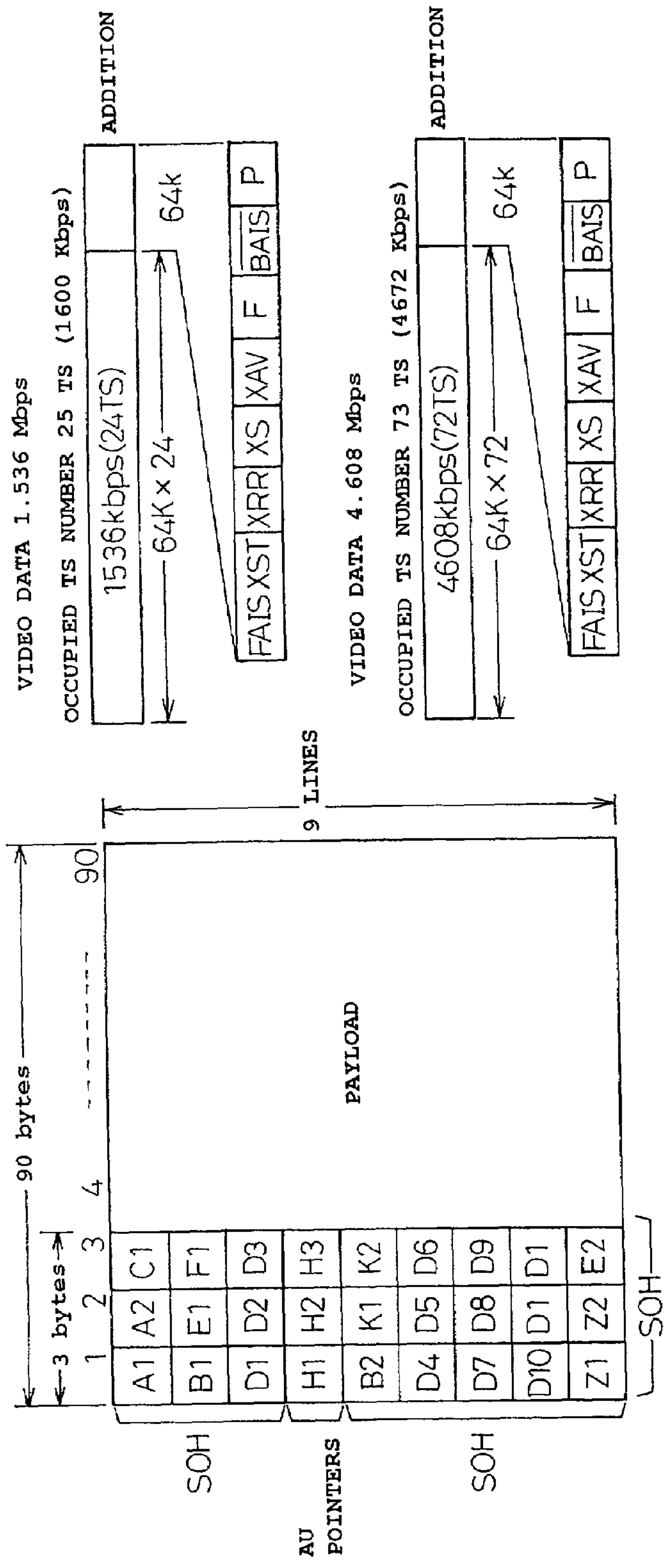
FIG. 2(*a*) and FIG. 2(*b*) are graphical representations showing one example of the sending data in the system described in FIG. 1.
Figure 2B:
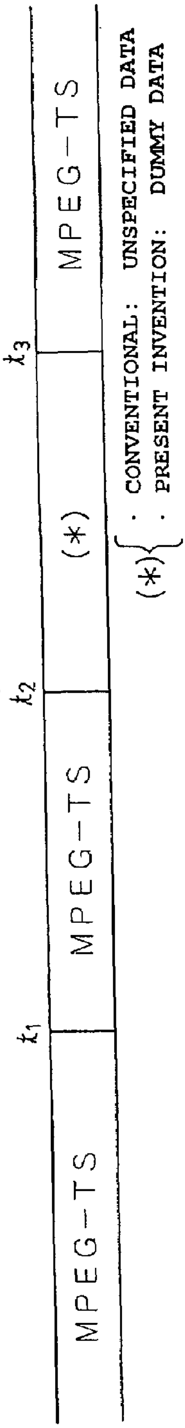

For comparison, a conventional case shown in FIG. 2(*b*) is represented in FIG. 4(*a*). When the data sending unit, to which a data sending for the time slice between t2~t3 is allocated, has no data to send, it results, as mentioned above, in the existence of NULL data (all "1") or unspecified data. As a result, a parity error occurs in the data receiving unit 3.

A case of dummy data shown in FIG. 3 transmission is represented in FIG. 4(*b*) where appropriate parity bits (P) are further added to said dummy data, (for example, the NULL data consisting of "1" only) according to its data length. Sending of such a dummy data enables the data receiving unit 3 to constantly receive normal data from one or plurality of data sending units 4-1~4-n. Thus a possibility of false determinations, including determination of a circuit abnormality due to parity error, is eliminated.

Figure 5:
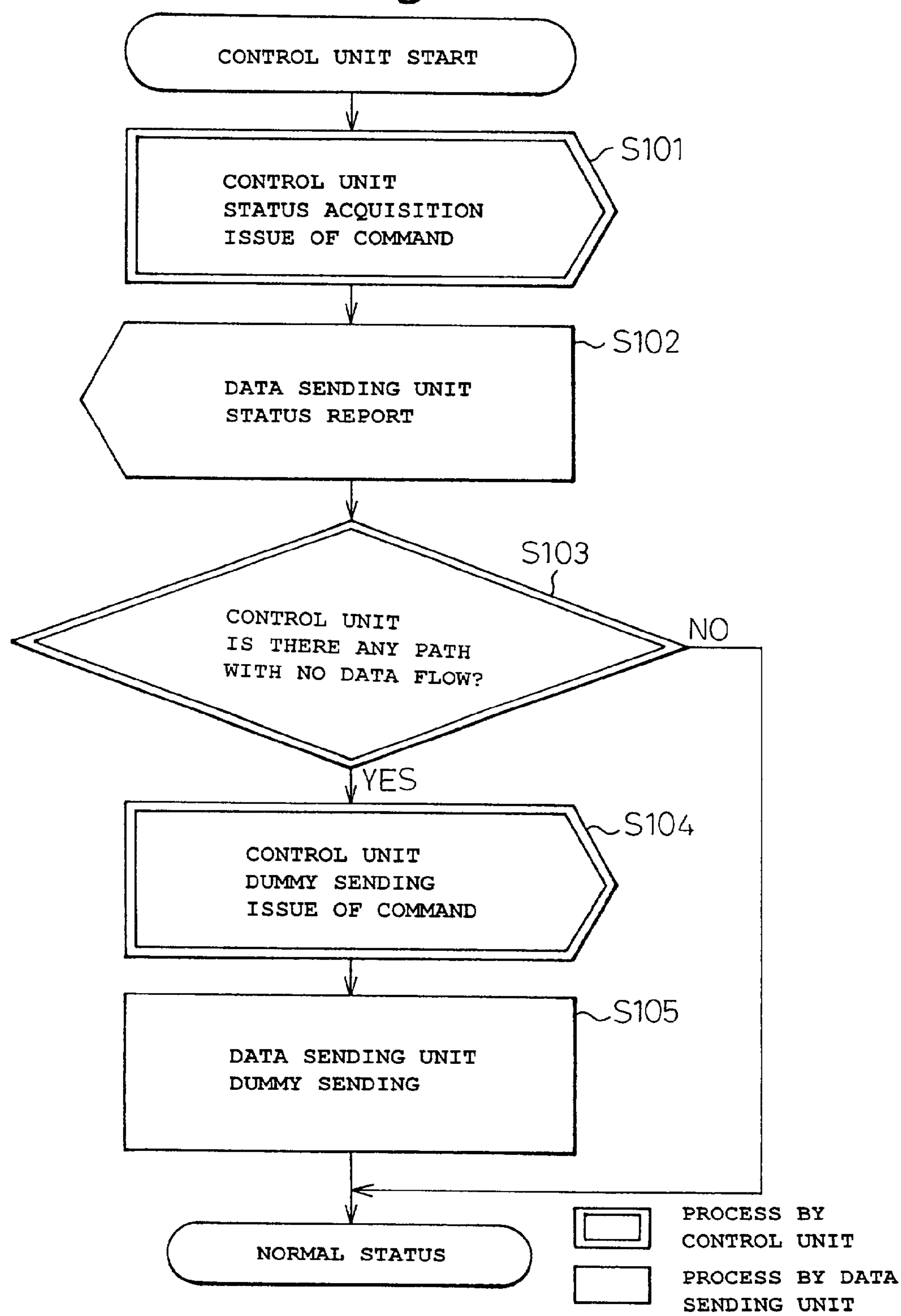
FIG. 5 is a flow chart (1) representing one example of the dummy data sending control performed in the first embodiment.
Figure 6:
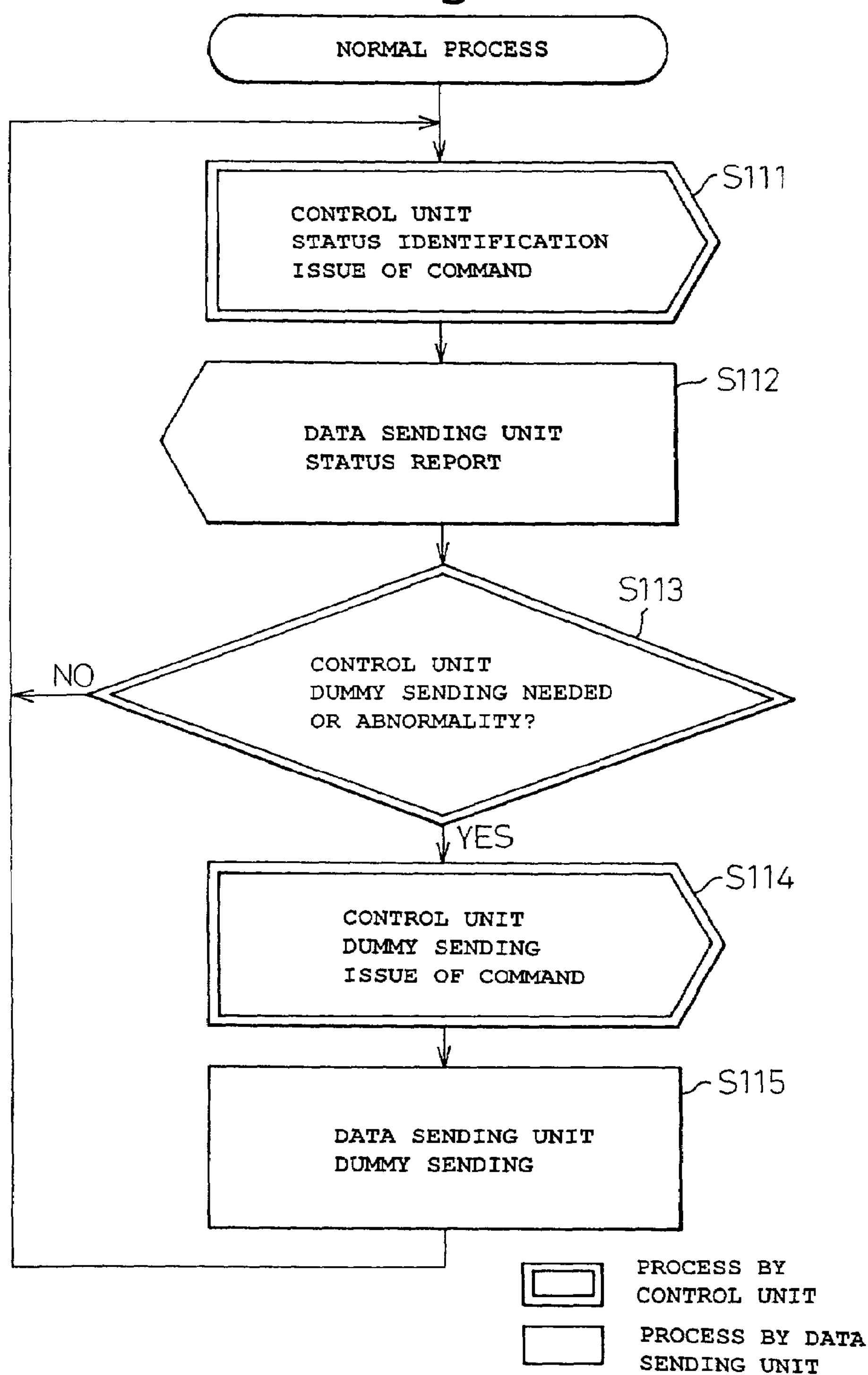
FIG. 6 is a flow chart (2) representing another example of the dummy data sending control performed in the first embodiment.

FIG. 5 and FIG. 6 are the flow charts representing dummy data control shown in FIG. 3(*a*). Explanation of said flow chart will be presented with reference to a more specific units block constitution shown in FIG. 3(*b*).

FIG. 5 is a flow chart representing the dummy data sending control on the start of the control unit 2. Upon starting by being supplied with power, the identification request section 21 in the control unit 2 issues an status acquisition command to all data sending units 4-1~4-n in the system (S 101). On receiving said status acquisition command, each data sending unit 4-1~4-n, using the status report section 41, reports the status of each sending unit itself, in this case, reports a paths with no sending data to the control unit 2 (S102).

Then, the control unit 2, using the determining section 22, determines from said report whether the path with no sending data exist (S 103). When the path with no sending data exists, the control unit 2 issues the requisition command for transmitting the dummy sending data, based on scheduling data in the scheduling section 23, to a predetermined unit among the data sending units 4-1~4-n (S 104). Receiving said command, the predetermined data sending unit, using the dummy sending section 44 in the sending/receiving section 42, sends the dummy data to the path with no sending data (S 105). As described above, the control unit 2, at its start, recognizes the path with no sending data preemptively and automatically, and the unit among the data sending unit 4-1~4-n, instructed by said control unit 2, performs the dummy data sending control. In this manner, a detection of the false parity error by the data receiving unit 3 is prevented.

FIG. 6 is a flow chart representing the dummy data sending control when the control unit 2 runs under a normal condition.

In this case, the identification request section 21 in the control unit 2 also issues the status acquisition command, periodically or according to the needs, to each data sending unit 4-1~4-n, which is required to recognize present status of the data sending units 4-1~4-n in the system (S 111). Receiving said status acquisition command, each data sending unit 4-1~4-n, using the status report section 41, reports its sending status to the control unit 2 in a way shown in FIG. 5. The control unit 2, using the determining section 22, determines a various status of operating data sending units 4-1~4-n from the report, including status change from no data sending to data sending, addition or deletion of the data sending unit, and unit or power failure.

When a data sending status change or a unit status abnormality is detected by said determining section 22 (S 113), the control unit, referring to an information of the data sending unit having status change or abnormality or to a scheduling data of the schedule section 23, issues the data sending request command to other normal unit among the data sending units 4-1~4-n (S 114). The normal data sending unit receiving said command sends the dummy data, which is to be transmitted from the dummy data sending section 44, to the path specified (S 115). As described above, the control unit 2 maintains a close watch, in its operation, on the paths with no data sending or the data sending units abnormality, and controls dummy data sending accordingly. Thus, false parity error detection in the receiving units can be avoided.

In the case of FIG. 5 and FIG. 6, on the other hand, when all the data sending units 4-1~4-n are instructed via the console not to send any data, the determining section 22 of the control unit 2 determines that a path with no data exist (S 103 or 113), and instructs a specific data sending unit, based on a scheduling of the schedule section 23, to send the dummy data. The instructed data sending unit sends the dummy data using dummy data sending section 44 (S 104, 105, or S 114, 115).

Meanwhile, when each data sending unit 4-1~4-n itself detects an abnormality of the control path 8-1, the data sending unit stops sending data or dummy data by itself to behave in a way as if it is eliminated from the system. A specific explanation regarding this function will be presented in the second embodiment next to be described.

Figure 7A:
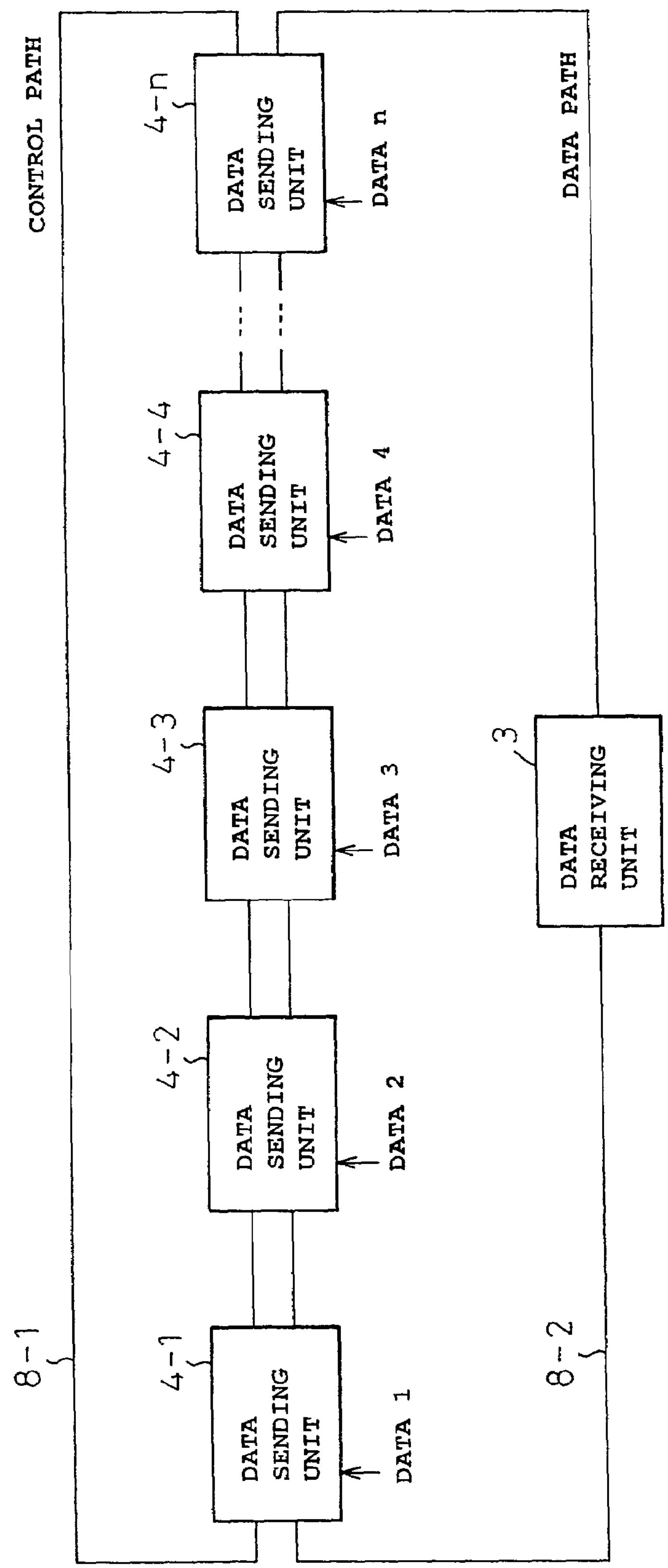
FIGS. 7(*a*)~7(*c*) are graphical representations of the second embodiment of this invention.
Figure 7B:
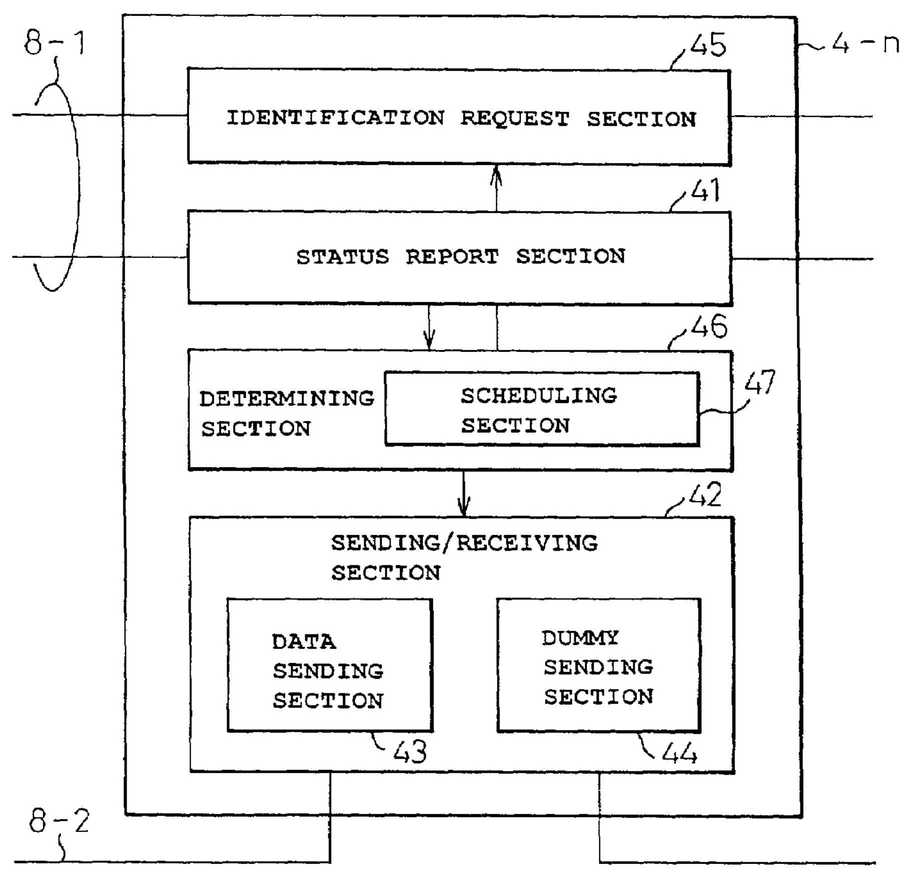
Figure 7C:
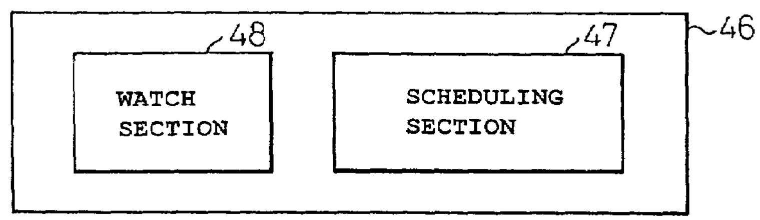

FIG. 7(*a*) and FIG. 7(*c*) represent the second embodiment of this invention.

As explicitly shown in FIG. 7, the control unit 2 for central management of the dummy data sending control (see FIG. 3(*a*)) does not exist in this embodiment. The dummy data sending control is performed by each data sending unit 4-1~4-n, which recognizes the other's unit status alternately through the control path 8-1. In a system constitution shown in FIG. 3(*a*), the dummy data sending control itself, in the invention herein presented, becomes impossible by a failure of the control unit 2 unless a pair of the control units have been arranged. In this embodiment, on the other hand, the units for dummy data sending control are distributed among each data sending unit 4-1~4-n to provide more solid, simple network for executing this invention.

Figure 8:
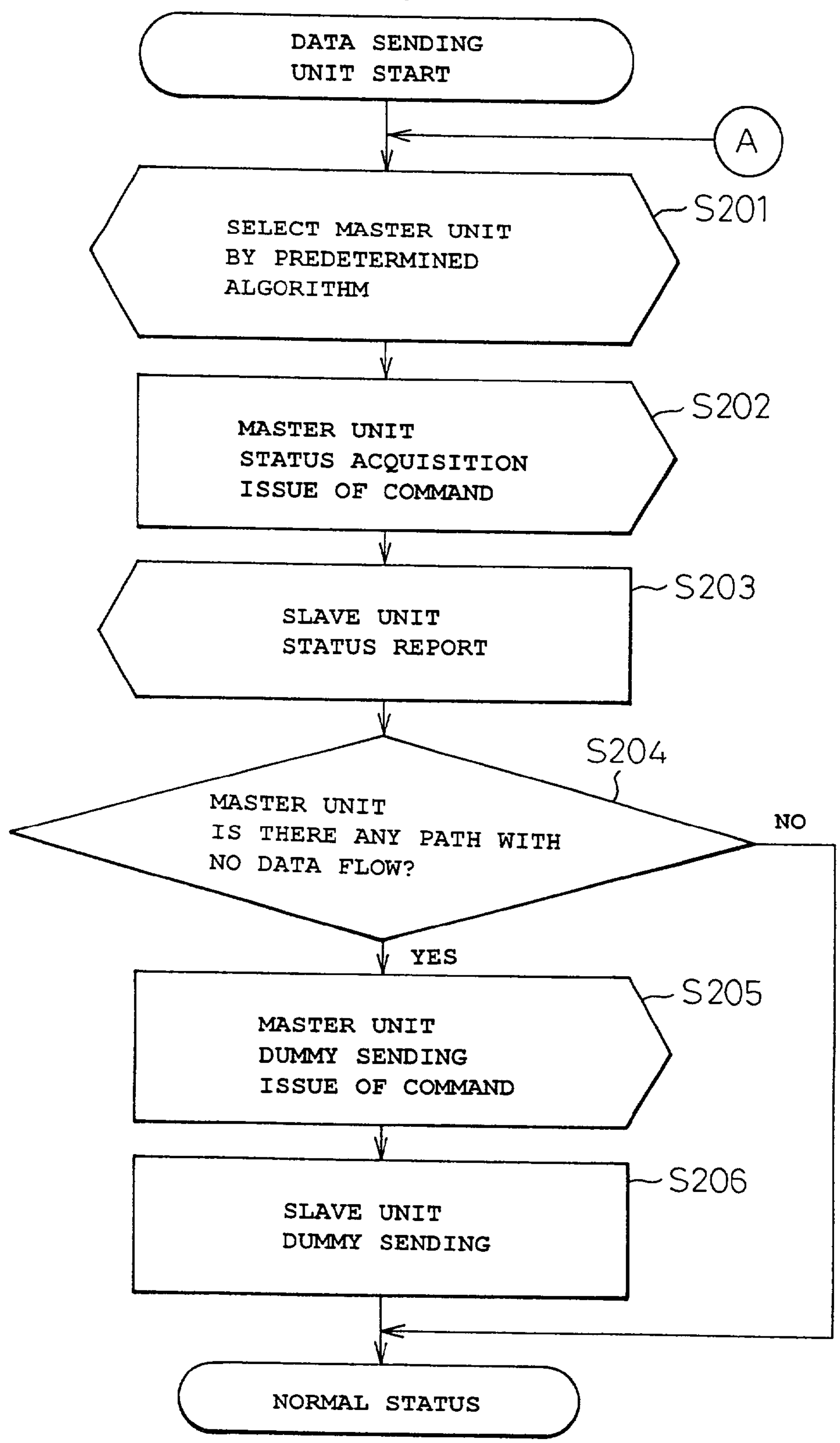
FIG. 8 is a flow chart (1) representing one example of the dummy data sending control performed in the second embodiment.
Figure 9:
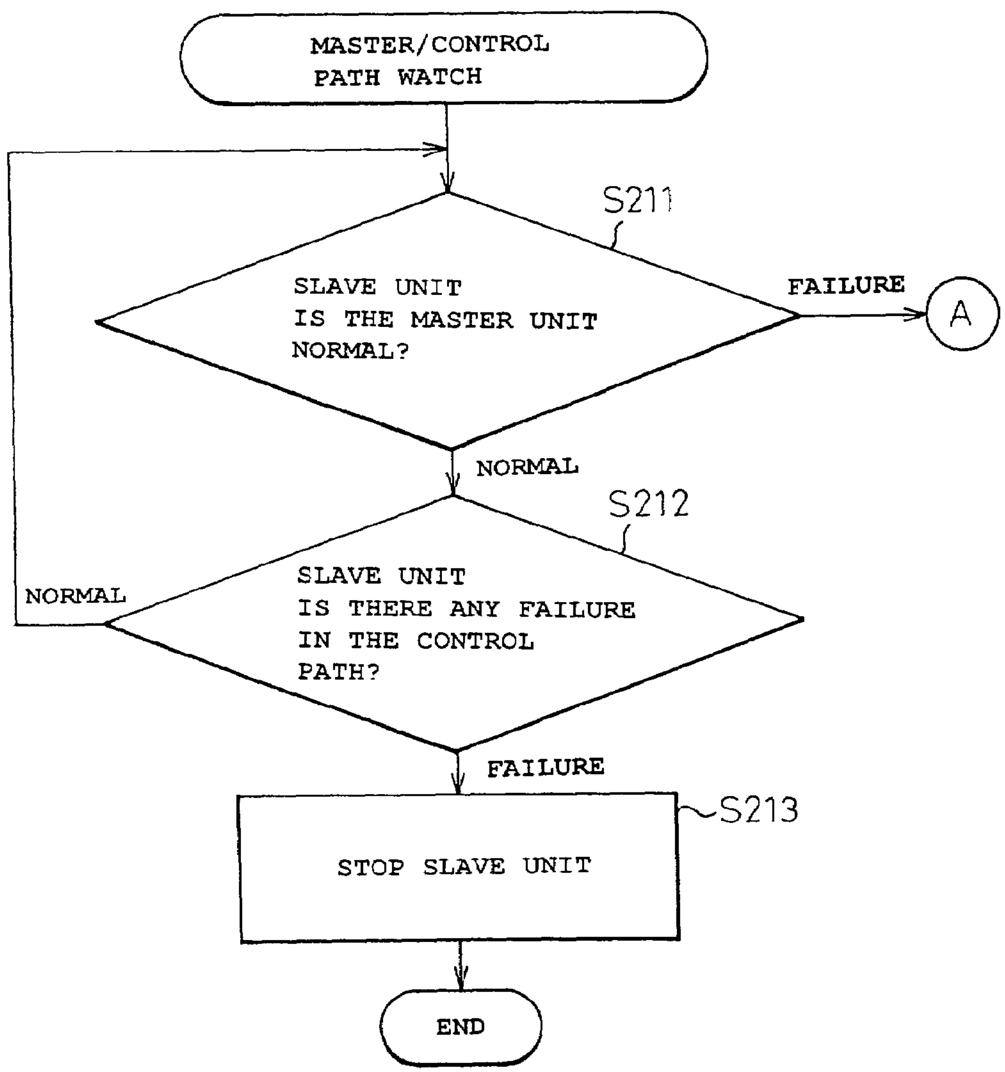
FIG. 9 is a flow chart (2) representing another example of the dummy data sending control performed in the second embodiment.

FIG. 7(*b*) and FIG. 7(*c*) are the graphic representations showing specific block constitutions of the data sending units 4-1~4-n in this embodiment. FIG. 8 and FIG. 9 are flow charts showing the dummy data sending control based on the constitution represented in FIG. 7(*a*) and FIG. 7(*c*). The following explanation will be presented by referring to these figures.

In FIG. 8, each data sending unit 4-1~4-n starts by being supplied with power, and subsequently, communicates with other units and selects a master unit performing the function equivalent to that of the control unit 2 shown in FIG. 3. A predetermined algorithm, which specifies a first or last unit with power supply, or a unit selected by using certain random number list, is employed in the master unit selection (S 201). The determining section 46 performs a process for said master unit selection.

Once selected, the master unit controls, just like the control unit 2 shown in the FIG. 5 and FIG. 6, dummy data sending of other slave units which function as data sending unit (S 202~S 206). It is noted that the regular process flow chart represented in FIG. 6 is not shown in this embodiment. It is omitted since it is identical with that of this embodiment. It is also noted that the block constitution of the data sending unit 4-n shown in 7(*b*) comprises that of control unit 2 and the data sending unit 4-n shown in the FIG. 3(*b*), so that the data sending unit 4-n in this embodiment can work both as master unit and slave unit. Therefore, no further explanation will be presented for these units. Additional blocks indicate the units having functions that can be arranged by additional software.

A failure watch section 48 shown in FIG. 7(*c*), which is particular to this embodiment, watches constantly or periodically a failure of the master unit and the control path to detect their abnormality. FIG. 9 is a flow chart representing a process to be executed by the determining section 46 in accordance with the watch result. The failure detection on the master unit by the failure watch section 48 is to be performed, for example, as follows. As shown in FIG. 6, the master unit periodically transmits the status identification command to the slave unit (S 111). Without receiving said command from the master unit after a predetermined time has passed, the slave unit determines that the master unit has failed. In this case, the slave unit, on detecting the master unit failure, starts a process for selecting a new master unit among other slave units (S 201 in FIG. 8). Then a newly selected master unit continues the subsequent process.

The step S212, shown in FIG. 9, represents a process where the slave unit detects a failure in the control path 8-1—for example, a breaking of wire or abnormal increasing of error rate—and stops working (S 213). The stopped slave unit is in a status of being separated from the path (through path). This process prevents a situation that an effect produced by a serious failure, such as the control path failure, grows more complicated as it pass through each node in the ring network.

While a distributed constitution comprising the master and slave units is described above, other constitutions are by no means eliminated. It is also a possible constitution where each data sending unit 4-1~4-n has an information of other data sending units through the control path 8-1, by which each data sending unit makes its own decision to control the dummy data sending.

Figure 10A:
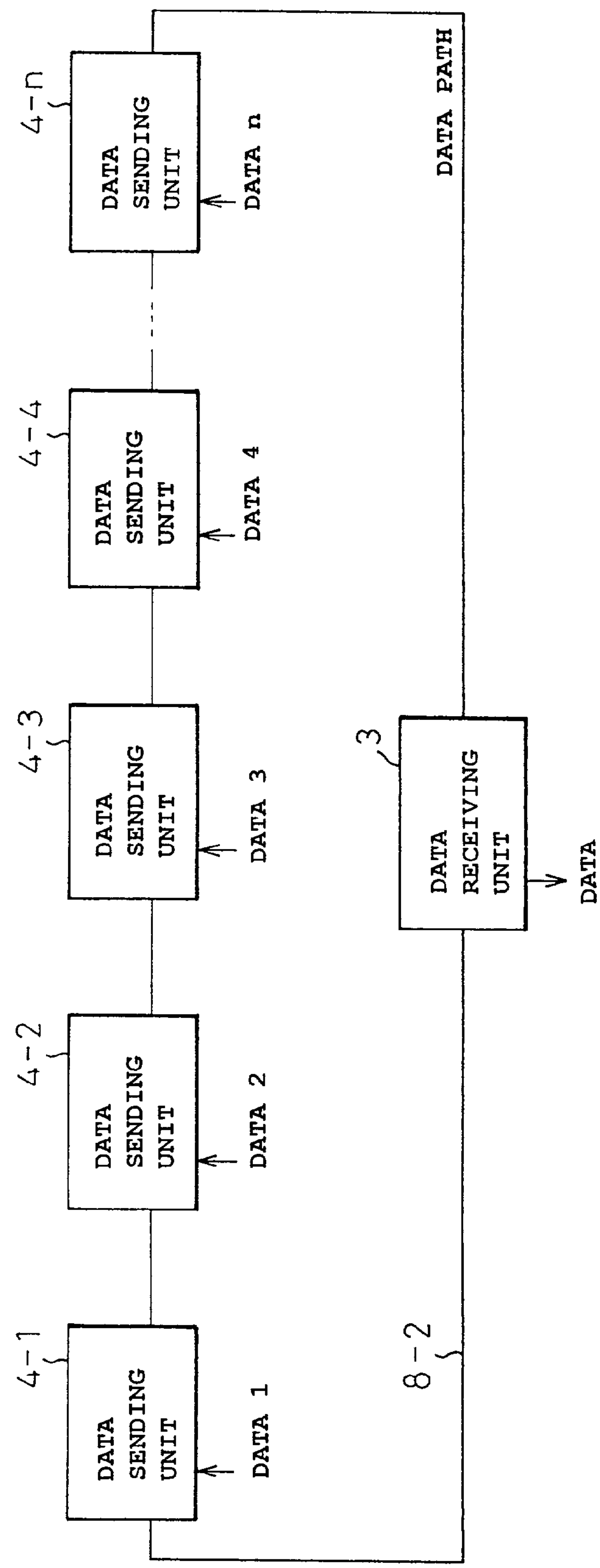
FIG. 10(*a*) and FIG. 10(*b*) are graphical representation of the third embodiment of this invention.
Figure 10B:
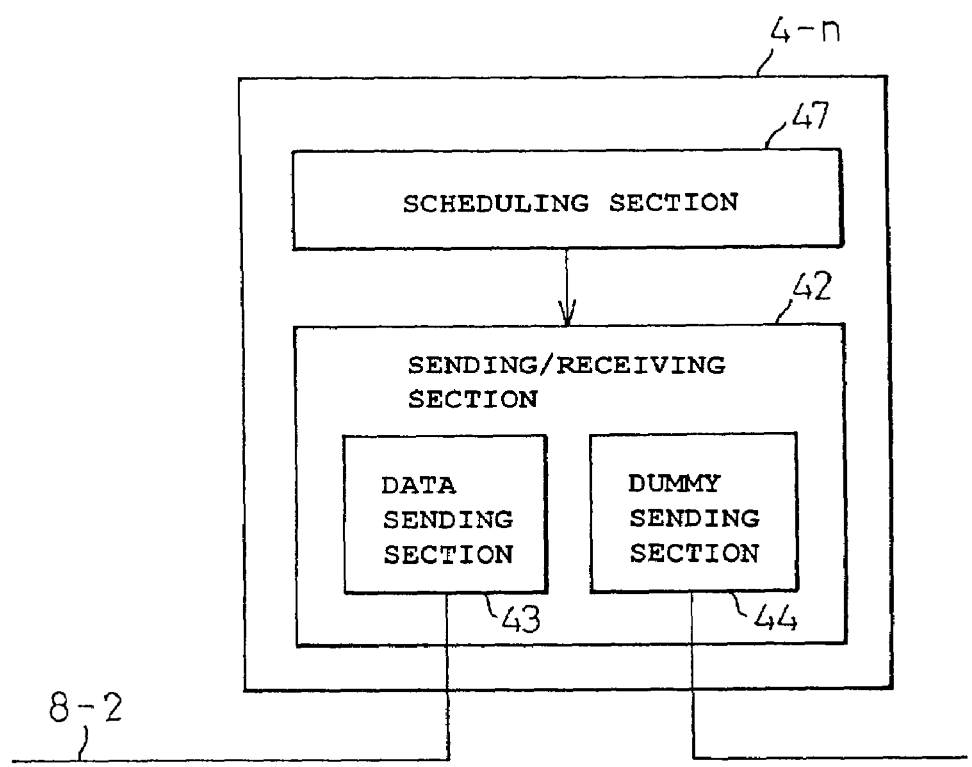
Figure 11:
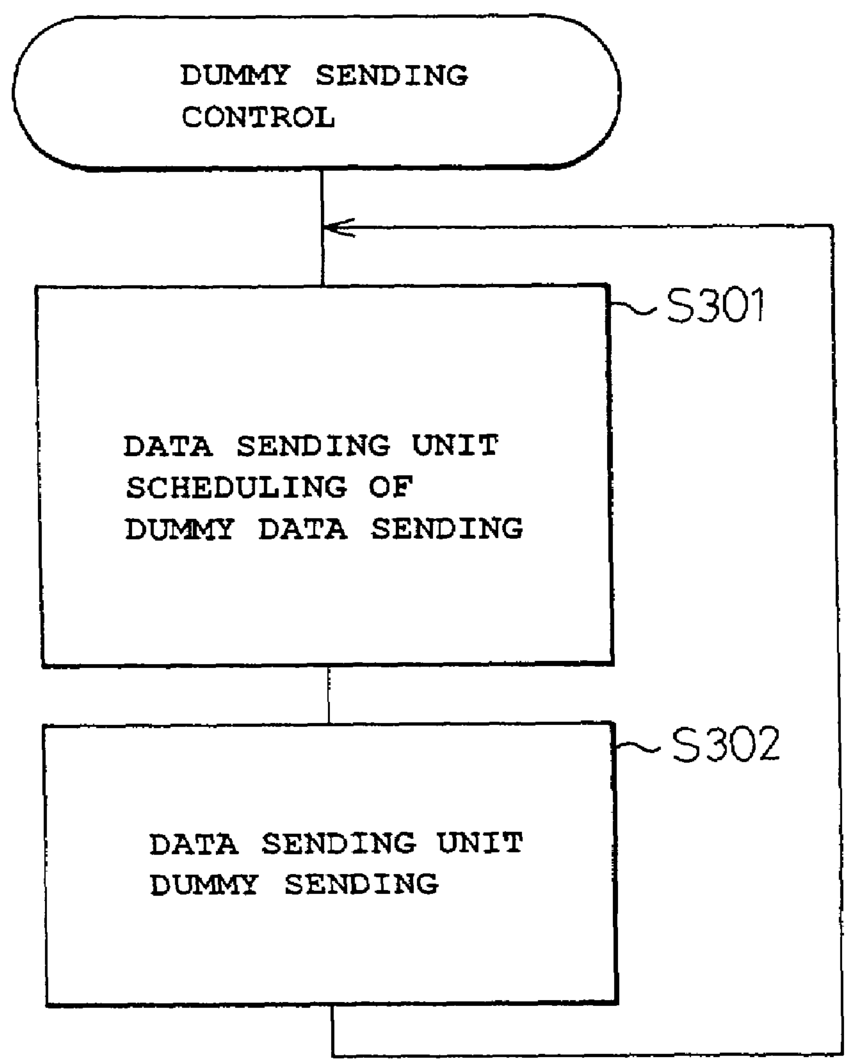
FIG. 11 is a flow chart representing an example of the dummy data sending control performed in the third embodiment.

FIG. 10(*a*) and FIG. 10(*b*) represent the third embodiment of this invention. FIG. 11 is a flow chart representing the dummy data sending control shown in FIG. 10(*a*) and FIG. 10(*b*).

As explicitly shown in FIG. 10(*a*), no controlling path is employed in this embodiment. Each data sending unit 4-1~4-n is under instruction from the scheduling section 47, having predetermined schedule, which is shown in FIG. 10(*b*) (S 301). The data sending section 43 in the sending/receiving section 42 sends the data, and the dummy sending section 44 sends a dummy data required (S 302). When the contents of the schedule is to be changed, an operator is obliged to change a setup of each data sending unit 4-1~4-n manually. Providing such a simple constitution described above allows the invention herein presented to be applied in a network with smaller scale, wherein the dummy data sending control disclosed by this invention prevents the detection of false parity error in the data receiving unit.

As described heretofore, this invention presents the system with plural data sending units having plural logical paths, each data sending unit being able to send the data freely to each logical path. In the system presented, when a time span with no data insertion happens to exist during the time a plurality of the data sending units change the insertion data in a time sharing order on the same path, unnecessary error detection can be avoided as the predetermined data sending unit sends the dummy data with an appropriate parity added. The data sending unit detects an abnormality in the network, which can also prevent a flow of unstable data in the network.

The dummy data sending described in this invention can be performed by central control with control unit, or by distributed control with interacting data sending units, or by stand-alone control with individual unit.

What is claimed is:

1. A data sending system, comprising:

a network having a control path and a data path;

a control unit for instructing data sending through said control path;

one or a plurality of data sending units sending data to a specific path among a plurality of logical paths of said data path, by an instruction from said control unit; and a data receiving unit permanently connected to said specific path among the plurality of logical paths of said data path;

wherein, said control unit has a determining section for determining a time span during which no sending data exist in the logical path connected to said data receiving unit, and for instructing one of said data sending unit to send a dummy data during the time span, and said data sending unit has a dummy data sending section for sending the dummy data, to which appropriate parity information is added, by said instruction.

2. The system claimed in claim 1, further comprising:

said control unit having an identification request section for requesting said one or a plurality of data sending units to identify data sending status; and said data sending unit having a status report section for reporting, according to said identification request, a data sending status of said data sending unit to the control unit;

wherein, the determining section of said control unit determines, according to a content of said information, the time span during which no sending data exists in the logical path connected to said data receiving unit.

3. The system claimed in claim 2, wherein the determining section of said control unit further includes a scheduling section for specifying the data sending unit, which performs said dummy data sending according to a predetermined order or an algorithm.

4. The data sending system, comprising:

a network consisting of the controlling path and data path;

a plurality of data sending units which communicate each other through said control path and send the data to a specific path among plurality of the logical paths of said data path; and the data receiving unit permanently connected to a specific path among the plurality of logical paths of said data path;

wherein, said data receiving unit comprises;

an identification request/status report section for performing a process of identification request and report of data sending status in each data sending unit by communication through said control path;

a determining section for determining, according to said identification request and report, the time span during which no sending data exist in the logical path connected to the data receiving unit:

a scheduling section for performing a process of dummy data sending scheduling during the time span; and a dummy data sending section for sending the dummy data, to which the appropriate parity information is added, according to said scheduling.

5. The system claimed in claim 4, wherein said data sending unit further has a failure watch section for watching a failure in said control path, said data sending unit separating itself from said control path on detecting the failure.

6. The system claimed in claim 4, in which the data sending unit, selected according to a predetermined order and an algorithm as a master unit, determines the time span by said determining section, and sends the dummy data by said dummy data sending section; and wherein, another data sending unit, working as a slave unit, sends the dummy data by said dummy data sending section according to an instruction from said master unit.

7. The data sending system, comprising:

the network including data path;

one or plurality of data sending units for sending the data to a specific path among the plurality of logical paths of said data path; and the data receiving path permanently connected to the one among the plurality of logical paths of said data path;

wherein, said data sending unit comprising;

the scheduling section for performing the scheduling process of the predetermined time span, during which no sending data exist in the logical path connected to said receiving unit; and the dummy data sending section for sending the dummy data to which the appropriate parity information is added.

8. A data sending method for a ring-shaped network having one or plurality of data sending units, to which the data receiving unit for receiving the data from said data sending unit is connected; wherein, at least one of said data sending unit sends the dummy data, to which the appropriate parity information is added, to said data receiving unit, during the time span in which no data to be sent, to said data receiving unit, exists.

* * * * *